United States Patent
Ai (12)

(10) Patent No.: US 6,354,745 B1
(45) Date of Patent: Mar. 12, 2002

(54) FULLY SELF-ALIGNING ROLLER BEARING

(75) Inventor: Xiaolan Ai, Massillon, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 09/397,682

(22) Filed: Sep. 16, 1999

(51) Int. Cl.$^7$ ............................................... F16C 19/26
(52) U.S. Cl. ........................ 384/565; 384/568; 384/569
(58) Field of Search .............................. 384/565, 568, 384/569, 571, 564

(56) References Cited

U.S. PATENT DOCUMENTS

| | | |
|---|---|---|
| 1,280,664 A | 10/1918 | Clark |
| 1,528,363 A | 3/1925 | Bronander |
| 1,862,641 A | 6/1932 | Turner |
| 1,973,994 A | 9/1934 | Peterson |
| 1,982,899 A | 12/1934 | Buckwalter |
| 2,767,037 A | 10/1956 | Williams |
| 4,705,411 A | 11/1987 | Kellstrom |
| 4,978,235 A | 12/1990 | Jacob |
| 5,427,458 A | 6/1995 | Sanchez |

FOREIGN PATENT DOCUMENTS

| | | |
|---|---|---|
| DE | 702175 | 1/1941 |
| DE | 29511873 | 9/1995 |
| FR | 1274782 | 2/1962 |
| WO | WO9617179 | 6/1996 |
| WO | WO9630662 | 10/1996 |
| WO | 2311568 | 1/1997 |
| WO | WO9708469 | 3/1997 |
| WO | 9708469 | 3/1997 |

*Primary Examiner*—Lenard A. Footland
(74) *Attorney, Agent, or Firm*—Polster, Lieder, Woodruff & Lucchesi, L.C.

(57) ABSTRACT

An antifriction bearing having inner and outer races and rollers between the races accommodates axial misalignment of the races and also axial displacement of one race relative to the other. In one form, the inner race has a cylindrical raceway presented outwardly, whereas the outer race has a spherical raceway presented inwardly toward the cylindrical raceway. Each roller has two arcuate end surfaces and a cylindrical intervening surface. The arcuate end surfaces generally conform to and roll along the spherical raceway, while the cylindrical intervening surface rolls along the cylindrical raceway. In another form, the inner race has a spherical raceway that is presented outwardly and the outer race has a cylindrical raceway that is presented inwardly toward the spherical raceway. Each roller has two cylindrical end surfaces and an arcuate intervening surface. The rollers contact the cylindrical raceway along their cylindrical end surfaces and the spherical raceway along their arcuate intervening surfaces which generally conform longitudinally to the spherical raceway.

9 Claims, 4 Drawing Sheets

FULLY SELF-ALIGNING ROLLER BEARING

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

The present invention relates generally to antifriction bearings and, more particularly, to fully self-aligning roller bearings which allow for simultaneous combination axial misalignment and axial displacement.

The typical antifriction bearing supports a shaft of one type or another in a housing, which surrounds the shaft, and likewise may take any of a variety of forms. The bearing, of course, enables the shaft to rotate in the housing or the housing to rotate around the shaft with minimum friction. Some antifriction bearings of current manufacture allow for misalignment or axial displacement of the rotating shaft relative to the housing, but not both. Axial misalignment occurs when the axis of the shaft is not parallel to the axis of the housing. Axial displacement occurs when the shaft moves generally parallel to the bearing axis relative to the housing or vice versa.

Some antifriction bearings currently available allow only for axial misalignment or axial displacement, but none of the current bearings are capable of offering the ability to dynamically compensate for significant axial misalignment and axial displacement simultaneously. As a result, when an antifriction bearing capable of compensating for axial misalignment is loaded with forces tending to cause axial displacement, components of the bearing are over-stressed with a resultant reduction in the life span of the bearing. Similarly, when a bearing capable of compensating axial displacement is loaded with forces tending to cause axial misalignment, the bearing components are again overloaded and the bearing life span is subsequently reduced.

The life of an antifriction bearing is also quite dependant on the amount of friction within the bearing components. Higher friction induces greater wear on each of the individual components of the bearing. Most of this bearing friction results from either excessive point loading on the bearing components or inadequate lubrication of the bearing components. Excessive point loading occurs when the rolling elements slip on the bearing raceways causing the rolling elements to skew. Although some bearing designs attempt to minimize this friction through various means of lubrication, current bearing designs tend to lack the ability to trap the lubricating fluids within the proper area of the bearing where the friction is most likely to occur.

The present invention overcomes these and other problems by providing an almost unlimited capacity to dynamically and simultaneously compensate for both axial misalignment and axial displacement. The design of the rollers allows for axial misalignment through the interaction of curved surfaces of the rollers with a spherical raceway on one of its races, and for axial displacement through the interaction of cylindrical surfaces on the rollers with a cylindrical raceway on the other race. Additionally, the design of the rollers allows for a quantity of lubricant to be maintained within the cavities between the rollers and the inner and outer raceway, and be distributed to the contact areas between the rollers and the inner and outer raceways to effectively lubricate the bearing.

This same roller design also provides for generally uniform distribution of the stresses within the bearing to provide for equal contact strength at both the inner and outer raceways. By equalizing the stresses and the strengths placed upon these raceways, the life of the bearing is significantly extended.

Part of this equalization is also attributable to the absence of ribs on the raceways to contain the rollers during bearing operation. Most bearings require annular ribbed surfaces integrated with the raceway designs to capture the rolling elements within the bearing. While these ribs succeed in retaining the rolling elements within the bearing, they also create significant wear within the bearing. During operation of such bearings, the rolling elements tend to rub against the ribs as the rolling elements attempt to equalize the internal forces of the bearing through dimensional displacement. This rubbing not only creates significant heat and causes wear to roller ends, it also causes the rollers to skew on the raceways. This significantly affects the bearing's performance. The lack of these retaining ribs on the races of the present bearings eliminates this heat and wear within the bearing components and reduces the tendency of roller skewing.

To achieve all of the above delineated effects, a number of algorithms dictate the dimensional relationship between the internal components of the bearing. These algorithms identify the anticipated loads and displacements for calculation of the various radii and inter-dimensional relationships needed to sustain the advantages of the bearing.

This invention also consists in the parts and in the arrangements and combinations of parts hereinafter described and claimed.

SUMMARY OF THE INVENTION

Therefore, the present invention resides in a bearing having inner and outer races and rollers between the races. One of the races has a cylindrical raceway and the other a spherical raceway. The rollers have surfaces which conform to the raceways. The geometry of the rollers and raceways is such that the bearing accommodates axial misalignment of the races and also axial displacement of the races.

It is an object of the invention to provide a fully self-aligning roller bearing capable of providing an almost unlimited capacity for axial misalignment and for axial displacement.

It is another object of the invention to provide an antifriction bearing which allows for equal strength design of the rollers and the inner and outer raceways of the bearing.

It is also an object of the invention to provide an antifriction bearing which reduces the internal frictions of the bearing through a design of the rollers which tends to captivate and apply lubricants to contact surfaces within the bearing.

It is yet another object of the invention to provide a bearing design that inherently reduces the amount of heat generated during bearing operation, thereby extending the useful life of the bearing.

Other objects and features of the present invention will be in part apparent and in part pointed out hereinafter.

DETAILED DESCRIPTION OF THE INVENTION

Figure 1:
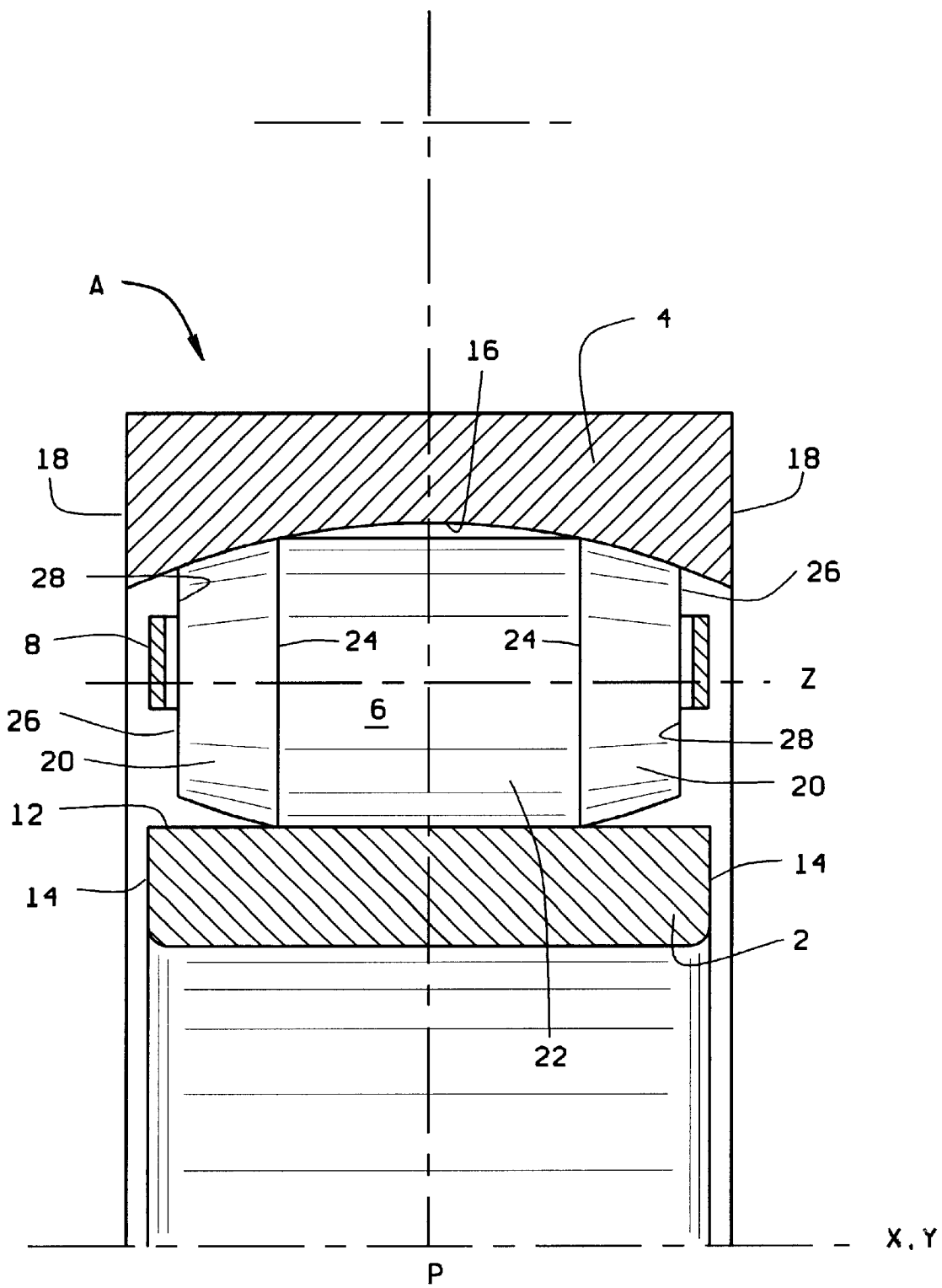
FIG. 1 is a sectional view of a bearing constructed in accordance with and embodying the present invention.
Figure 2:
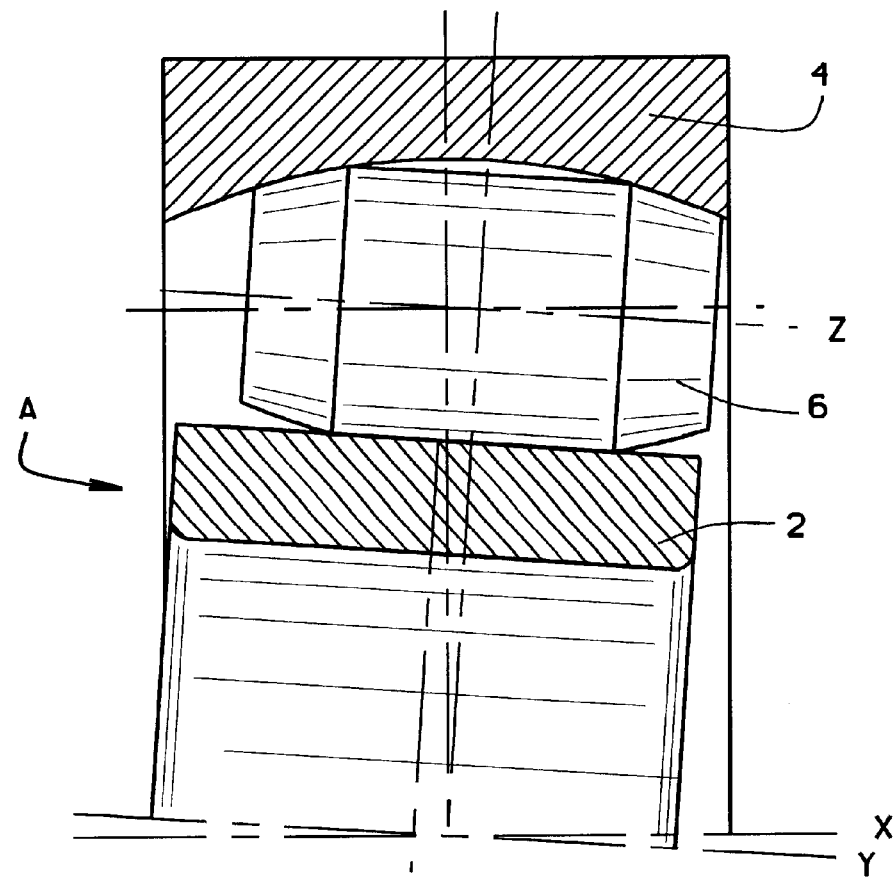
FIG. 2 is a sectional view of the bearing with its races misaligned and displaced axially.

Referring now to the drawings, a roller bearing A is shown in FIG. 1 which is configured to fit between two machine components, such as a shaft and a housing, to enable one of the components to rotate relative to the other with minimal friction. The bearing A accommodates axial misalignment of the machine components and further allows for axial displacement of the one component in relation to the other component as shown in FIG. 2. The bearing A in FIG. 1 includes an inner race 2 having an axis X, an outer race 4 surrounding the inner race 2 and having an axis Y, and rollers 6 located between the two races 2 and 4 to enable the inner race 2 to rotate relative to the outer race 4 or vice versa with little torque. In addition, the bearing A has a cage 8 which is likewise located between the races 2 and 4, and it maintains the proper spacing between the rollers 6. When the components supported by the races 2 and 4 are properly aligned, the axes X and Y coincide. When axial misalignment occurs, the axis X is inclined at an angle with respect to the axis Y.

The inner race 2, which is configured to fit around a shaft or similar machine component, has a cylindrical raceway 12 which is presented outwardly away from the axis X, its centerline coinciding with the axis X. The raceway 12 runs out to two end faces 14 which are squared off with respect to the axis X. Typically, one end face 14 will abut a shoulder on a shaft or similar machine component and the other end face 14 will abut a clamping device, such as a nut, so as to position the race 2 firmly on the machine component on which it is installed.

The outer race 4 has a spherical raceway 16 which is presented inwardly toward the axis Y and toward the raceway 12 of the inner race 2. The raceway 16 lies between two end faces 18 which are squared off with respect to the axis Y. The center of curvature for the spherical raceway 16 resides at a point P located along the axis Y. Every point along the raceway 16 exists at the same distance from the point P, and that distance is the radius of the raceway 16. The outer race 4 is configured to fit into a housing or similar machine component which clamps down against both end faces 18, thus firmly securing the race 4 in the component.

The rollers 6 fit between the races 2 and 4 and roll along the raceways 12 and 16 when relative rotation occurs between the races 2 and 4. Each roller 6 has arcuate end surfaces 20 and a generally cylindrical intervening surface 22 located between the arcuate end surfaces 20. The intervening surface 22 intersects the arcuate end surfaces 20 along circular edges 24 and the arcuate end surfaces 20 run out to end faces 26. The roller 6 has an axis Z with which the axial centerlines of the arcuate end surfaces 20 and the intervening surface 22 coincide. The arcuate end surfaces 20, while being tapered longitudinally are also curved longitudinally with the curvature conforming generally to the curvature of the spherical raceway 16 for the outer race 4.

Indeed, the arcuate end surfaces 20 of the rollers 6 bear against the spherical raceway 16, there being essentially line contact between each arcuate end surface 20 and the raceway 16. The cylindrical intervening surfaces 22 of the rollers 6 bear against the cylindrical raceway 12 of the inner race 2, there being generally line contact here as well.

Figure 4:
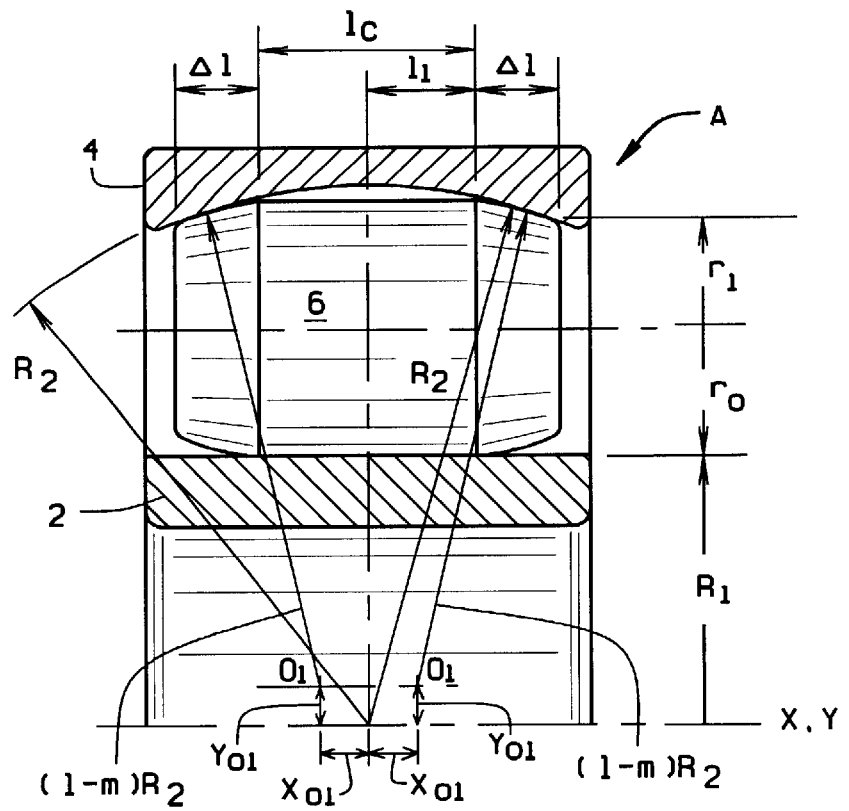
FIG. 4 is a sectional view of the bearing showing critical dimensions and adjustments in the geometry to compensate for roller deflection.

Preferably the stresses produced where the arcuate end surfaces 20 of the rollers 6 contact the raceway 16 of the outer race 4 should generally equal the stresses produced where the cylindrical intervening surfaces 22 of rollers 6 contact the cylindrical raceway 12 of the inner race 2. Under these circumstances, the races 2 and 4 will exhibit approximately equal life. To this end, the following relationships as shown in FIG. 4 should exist within the bearing:

$$\frac{R_1}{R_2} \le \frac{\Delta l}{l_1} \le \frac{R_1}{R_2} \frac{r_0}{r_1}$$

where:

$$\Delta l = \sqrt{R_2^2 - (R_1 + r_1 + r_0)^2} - l_1$$

$$l_1 = \sqrt{R_2^2 - (R_1 + 2r_0)^2}$$

$R_1$ is the radius of the cylindrical raceway 12 on the inner race 2.

$R_2$ is the radius of the spherical raceway 16 on the outer race 4.

$r_0$ is the radius of the cylindrical intervening surfaces 22 of the rollers 6.

$r_1$ is the radius of the end faces 26 on the rollers 6 (smallest radius of the tapered end surfaces 20)

$l_1$ is one half the length of the cylindrical intervening surfaces 22 on the rollers 6.

$\Delta_l$ is the length of the arcuate end surfaces 20 on the rollers 6.

Figure 3:
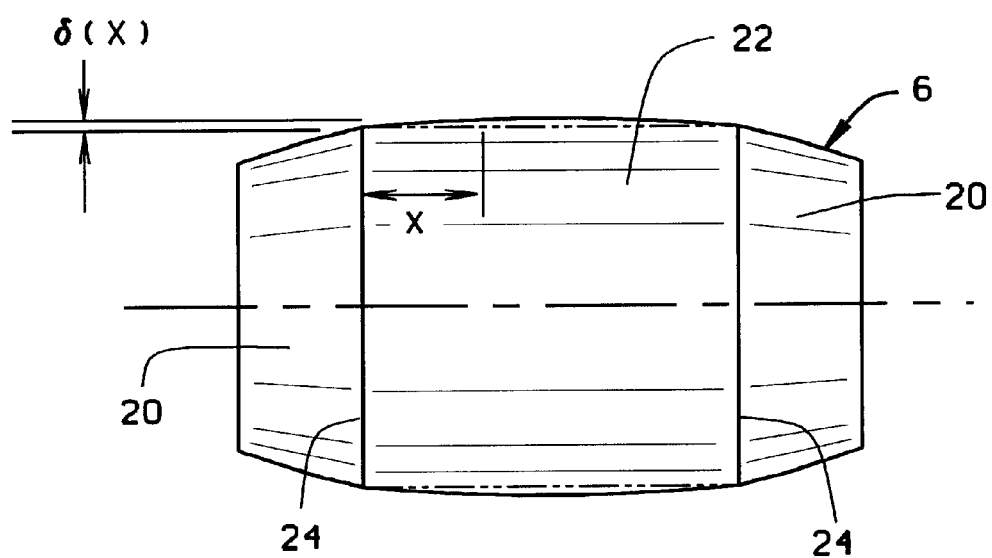
FIG. 3 is an elevational view of one of the rollers for the bearing.

The geometry heretofore described for the rollers 6 serves the bearing well when it transfers only light loads. However, when the bearing A is subjected to heavy loads, severe stress concentrations occur at the regions of contact with the circular edges. This is known as edge loading. In addition, the rollers 6 in the load zone deflect slightly from surface elastic deformation. After all, the end regions that carry the arcuate end surfaces 20 are generally cantilevered off the central region which carries the cylindrical intervening surface 22. This deflection and surface elastic deformation further elevates contact stresses along the raceways 12 and 16 in the regions of contact with the circular edges 24 for the rollers 6. To relieve edge loading and to compensate for the deflection and surface elastic deformation, the cylindrical intervening surface 22 should have a slight crown, as shown in FIG. 3. The radius of longitudinal curvature for the tapered ends surfaces 20 should also be slightly less than the radius of curvature for the spherical raceway 16 in FIG. 4 to prevent edge loading caused by contact between the end circular edges 28 of the rollers 6 and raceway 16. Moreover, the centers of curvature for the arcuate end surfaces 20 should be offset both axially and radially from the point P. The following formula determines the magnitude of crowning (references being to FIG. 3):

$$\delta(x) = \delta_e(x) + \delta_b(x) =$$

-continued $$\frac{2p_0}{\pi E'} \int_0^{l_c} \int_{-b}^{b} \frac{\sqrt{1-\left(\frac{y'}{b}\right)}}{\sqrt{(x-x')^2+y'^2}} dx'dy' + \frac{b}{12}\left(\frac{p_0}{E_{rol}}\right)\frac{x(x^3-2x^2l_c+l_c^3)}{r_0^4}$$

where:

$\delta_e(x)$=crown required to relieve edge loading $\delta_b(x)$=crown required to compensate for roller deflection (bending)

$$p_0 = \frac{2}{\pi}\frac{W}{bl_c}$$

$$b = \sqrt{\frac{8WR_e}{\pi l_c E'}}$$

$$\frac{1}{E'} = \frac{1}{2}\left(\frac{1-v_{rol}^2}{E_{rol}} + \frac{1-v_{rac}^2}{E_{rac}}\right)$$

$$R_e = \frac{r_0 R_1}{r_0 + R_1}$$

$E_{rol}$ is Young's modulus for the roller 6.
$E_{rac}$ is Young's modulus for the inner race 2.
$V_{rol}$ is Poisson's ratio for the roller 6.
$V_{rac}$ is Poisson's ratio for the inner race 2.
E' is effective Young's modulus.
$l_c$ is the length of the cylindrical intervening surface 22 for the roller 6.
$r_0$ is the radius of the cylindrical intervening surface 22 for the roller 6.
$R_1$ is the radius of the cylindrical raceway 12 for the race 2.
W is maximum roller load.

The following formula on the other hand determines the centers of longitudinal curvature for the two arcuate end surfaces 20 and hence the shortened radii of curvature for these surfaces (references being to FIG. 4):

$$x_{01} = \left[m\sin\left(\kappa - \frac{\gamma}{2}\right) + n\cos\kappa\right]R_2$$

$$y_{01} = \left[m\cos\left(\kappa - \frac{\gamma}{2}\right) - n\sin\kappa\right]R_2$$

$$R=(1-m)R_2$$

where:

$n=2 \sin \lambda/2$ $$\kappa = \frac{1}{2}\left(\text{Arcsin}\frac{l_c}{2R_2} + \text{Arcsin}\frac{l}{2R_2} - \gamma\right)$$

$$\gamma = \frac{1}{6\pi}\frac{Wl_c^2}{r_0^4 E_{rol}}$$

R=radius of curvature for the arcuate end surfaces 20.
m=is a positive number between 0 and 1.

To avoid possible contact between the spherical raceway 16 and the arcuate end surfaces 20 at roller end faces 26, m is selected such that m>$m_0$, where $m_0$ is solved from the following equation:

$$(1-m_0)\sin\frac{\gamma}{2m_0}\cos\left(\frac{\gamma}{2m_0} - Q\right) = \frac{\Delta l}{4R_2}$$

$$Q = \text{Arcsin}\left(\frac{l_1 + \Delta l}{R_2}\right)$$

In the operation of the bearing A of FIG. 1, the inner race 2 rotates within the outer race 4 or the outer race 4 revolves around the inner race 2. In either event, the rollers 6 roll along the cylindrical raceway 12 of the inner race 2 and along the spherical raceway 16 of the outer race 4. Actually, the intervening surfaces 22 of the rollers 6 roll along the cylindrical raceway 12, while the arcuate end surfaces 20 of the rollers 6 roll along the spherical raceway 16. Should axial misalignment develop between the races 2 and 4 as shown in FIG. 2 in which event an angle exists between the axis Y of the race 4 and the axis X of the race 2, the arcuate end surfaces 20 of the rollers 6 simply move in an arc along the spherical raceway 16 of the outer race 4 to accommodate the axial misalignment. The spherical raceway 16 extends beyond the end faces 26 of the rollers 6 so that the arcuate end surfaces 20 always remain entirely on the raceway 16. Should the inner race 2 require displacement axially, its cylindrical raceway 12 simply slides along the cylindrical intervening surfaces 22 on the rollers 6. Hence, the cylindrical raceway 12 is somewhat longer than the cylindrical intervening surfaces 22 of the rollers 6 and extends beyond both circular edges 24. Moreover, the spherical raceway 16 captures the rollers 6 axially and prevents them from leaving the space between the two raceways 12 and 16. Thus, the bearing A accommodates axial misalignment of a significant magnitude, and axial displacement of a significant magnitude is well. It needs no special preset radial clearance or radial compliance to accommodate axial misalignment or axial displacement or both.

That region of the spherical raceway 16 on the outer race 4 that lies opposite the cylindrical intervening surfaces 22 on the rollers 6 sees no contact with the rollers 6, and indeed, a substantial gap exists in the region between the raceway 16 and the rollers 6. This region of the spherical raceway 16 serves as a reservoir for a lubricant, such as grease, so that the bearing A is less likely to experience lubricant starvation than more traditional bearings. Furthermore, the inner race 2 of the bearing A is easily integrated with a shaft. To that end, the cylindrical raceway 12 forms the outer surface of the shaft. Theoretically, pure rolling contact occurs between the cylindrical intervening surface 22 of the rollers and the cylindrical raceway 12, so little friction develops at these lines of contact. While some microslippage occurs between the arcuate end surfaces 20 of the rollers 6 and the spherical raceway 16, it is small. The microslippage produces little heat and creates minimal torque within the bearing A. The confinement of the rollers 6 by the spherical raceway 16 also retards skewing of rollers 6.

Figure 5:
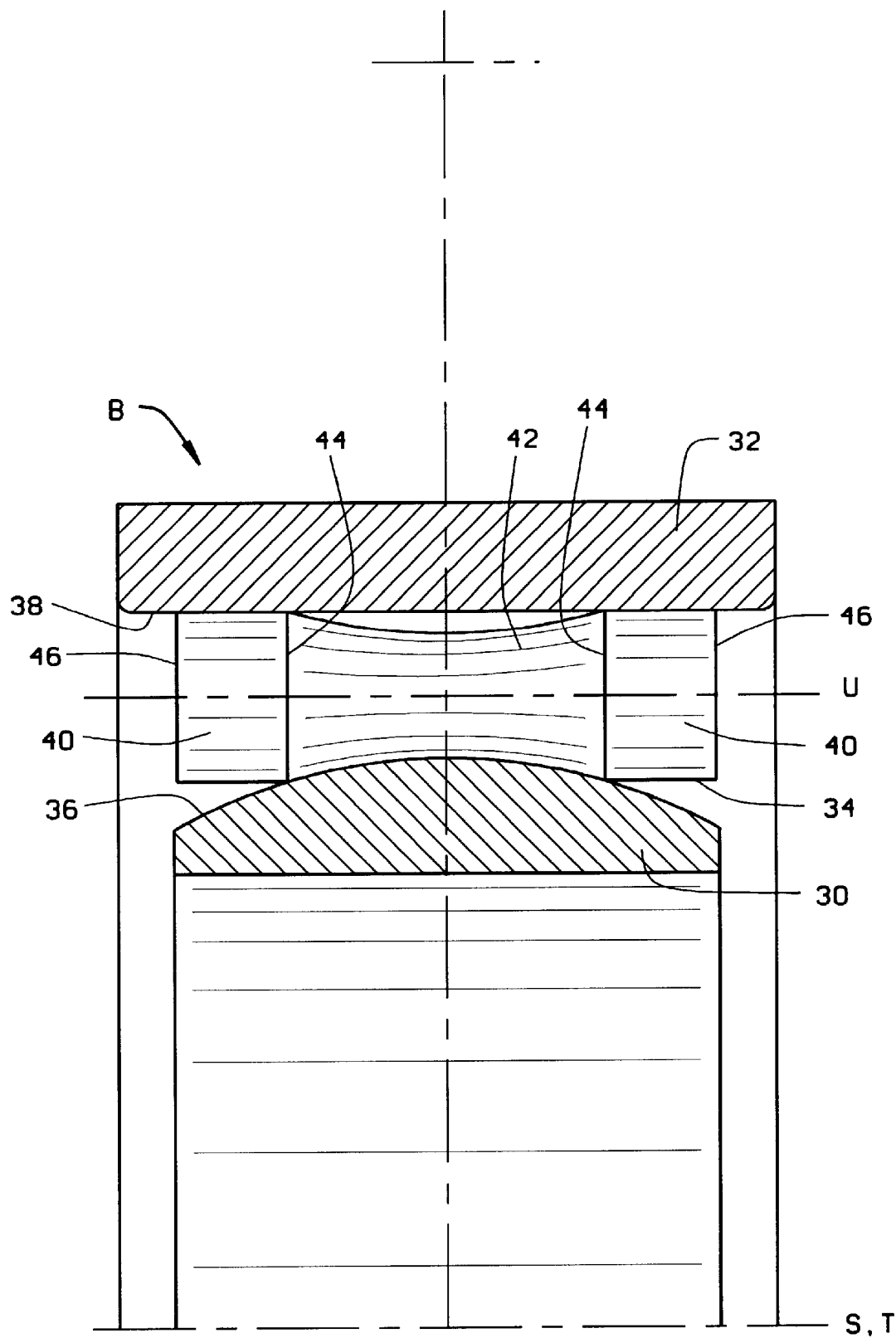
FIG. 5 is a sectional view of a modified bearing.

A modified antifriction bearing B, as shown in FIG. 5, is essentially the bearing A reversed. The bearing B includes an inner race 30 having an axis S, an outer race 32 having an axis T, and rollers 34 located between the races 30 or 32, with each having axis U.

The inner race 30 has a spherical raceway 36 presented outwardly away from the axis S. The outer race 32 has a cylindrical raceway 38 which is presented inwardly toward and surrounds the spherical raceway 36 of the inner race 30. Each roller 34 has cylindrical end surfaces 40 and an arcuate intervening surface 42. The surfaces 40 and 42 intersect at circular edges 44, while the end surfaces 40 run out to end faces 46. The cylindrical end surfaces 40 of the rollers 34 contact the cylindrical raceway 38 of the outer race 32 and roll along the raceway 38 when the bearing B is set in operation. The intervening surface 42 conforms in longitudinal curvature to the curvature of the spherical raceway 36 which it contacts, and indeed, rolls along when the bearing B is set in operation. Should axial misalignment develop between the races 30 and 32, the arcuate intervening surfaces 42 merely move in an arc over the spherical raceway 36 of the inner race 30 to accommodate the axial misalignment. The cylindrical end surfaces 40 of rollers 34 slide along the cylindrical raceway 38 of the outer race 32 to accommodate axial displacement between the races 30 and 32.

Figure 6:
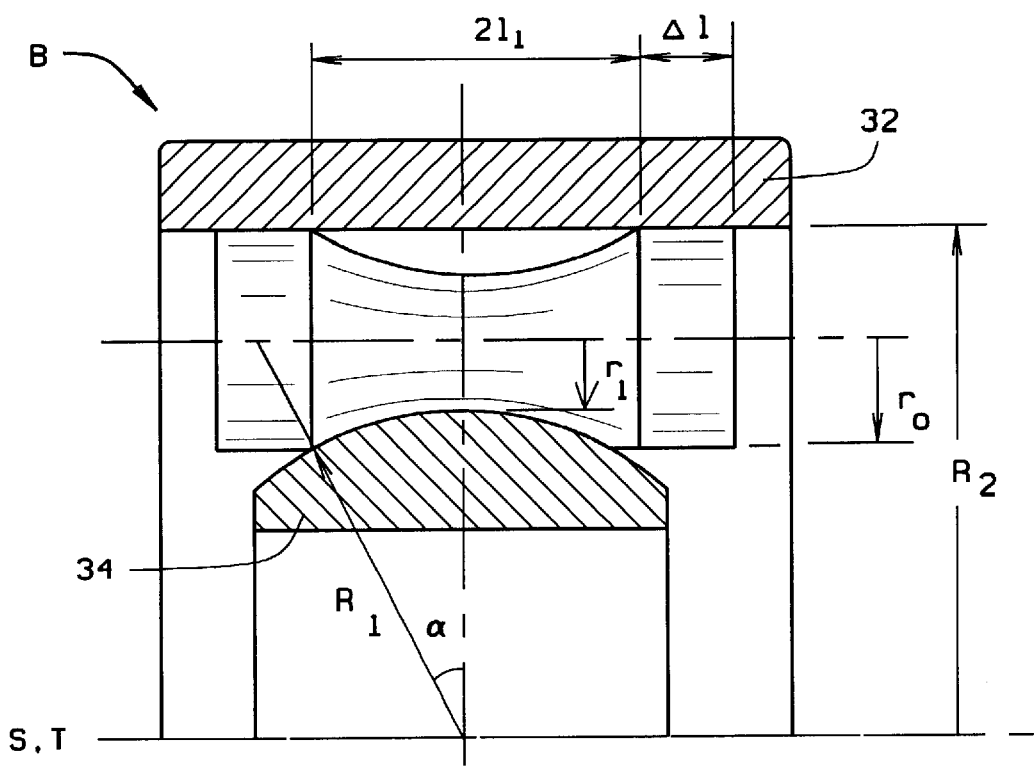
FIG. 6 is a sectional view of the modified bearing showing critical dimensions.

To generally equalize stresses along the raceways, the following relationship should exist within the bearing (reference being to FIG. 6):

$$\frac{R_1}{R_2}\frac{r_1}{r_0}\frac{(R_2 - r_0)}{(R_1 + r_1)} \le \frac{\Delta l}{l_1} \le \frac{R_1}{R_2}\frac{(R_2 - r_0)}{(R_1 + r_1)}$$

where:

$$l_1 = \sqrt{(r_{0-r_1}) 2 R_{1+r_1}}$$

$R_1$ is the radius of the spherical raceway 36 on the inner race 30.

$R_2$ is the radius of the cylindrical raceway 38 on the outer race 32.

$r_0$ is the radius of the cylindrical intervening surfaces 40 of the roller.

$r_1$ is the smallest radius of the spherical surface 42 of the roller.

$\Delta_l$ is the length of the cylindrical intervening surface 40 on each end of the roller.

The invention is intended to cover all changes and modifications of the example of the invention herein chosen for purposes of the disclosure which do not constitute departures from the spirit and scope of the invention.

Timken Fully Self-Aligning Bearing

| A. | bearing | 2. | inner race |
|---|---|---|---|
| B. | bearing | 4. | outer race |
| | | 6. | rollers |
| | | 8. | cage |
| X | axis | 12. | cylindrical raceway |
| Y | axis | 14. | end faces |
| Z | axis | 16. | spherical raceway |
| P | point | 18. | end faces |
| S | axis | 20. | arcuate end surface |
| T | axis | 22. | cylindrical intervening surface |
| U | axis | 24. | circular edges |
| | | 26. | end faces |
| | | 28. | end circular edges |
| | | 30. | inner race |
| | | 32. | outer race |
| | | 34. | rollers |
| | | 36. | spherical raceway |
| | | 38. | cylindrical raceway |
| | | 40. | cylindrical end surfaces |
| | | 42. | arcuate intervening surfaces |
| | | 44. | circular edges |
| | | 46. | end faces |

What is claimed is:

1. An antifriction bearing for facilitating rotation about an axis, said bearing comprising:

an inner race having a raceway presented outwardly away from the axis;

an outer race having a raceway presented inwardly toward the axis and surrounding the raceway of the inner race;

one of the raceways being cylindrical and the other raceway being spherical;

rollers arranged in a row between the races and contacting the raceways of the races, each roller having end faces and at least one generally cylindrical region and at least one generally arcuate region located between the end faces, the rollers being positioned between the raceways such that portions of both raceways extend beyond each of the end faces on the rollers, the cylindrical region contacting the cylindrical raceway and being set inwardly from the ends of the cylindrical raceway, so that one of said races can shift axially relative to the rollers, the arcuate region generally conforming longitudinally in contour to the spherical raceway and being set inwardly from the ends of the spherical raceway so that the rollers may assume varying inclinations with respect to the race along which the spherical raceway extends and thus accommodate axial misalignment of the races;

wherein the cylindrical raceway is on the inner race and the spherical raceway is on the outer race;

wherein the arcuate region of each roller is in two segments with each segment taking the form of an arcuate end surface and wherein the cylindrical region of each roller takes the form of an intervening cylindrical surface that lies between the two arcuate end surfaces;

wherein the cylindrical surface intersects the arcuate end surfaces at circular edges; and wherein the cylindrical surface of each roller is slightly crowned so that deflection of the roller and surface elastic deformation do not produce excessive contact stresses between the rollers and raceways at the circular edges of the rollers.

2. A bearing according to claim 1 wherein the center of longitudinal curvature for each arcuate end surface is offset from the center of curvature for the spherical raceway, and the radius of the longitudinal curvature for each arcuate end surface is less than the radius of curvature for the spherical raceway.

3. An antifriction bearing comprising: an inner race having an axis X and a cylindrical raceway presented outwardly away from the axis X; an outer race surrounding the inner race and having an axis Y and a spherical raceway presented inwardly toward the axis Y, with its center of curvature being along the axis Y; and rollers arranged in a row between the inner and outer races, each roller having two arcuate end surfaces and a substantially cylindrical intervening surface located between the end surfaces, the arcuate end surfaces being contoured longitudinally to generally conform to the spherical raceway, each roller contacting the spherical raceway along its arcuate end surfaces, each roller contacting the cylindrical raceway along its cylindrical surface, the cylindrical surface being slightly crowned so that deflection of the roller and surface elastic deformation in the presence of a load transmitted through the roller do not overly concentrate stresses at the ends of the cylindrical intervening surface.

4. A bearing according to claim 3 wherein the spherical raceway extends beyond the arcuate end surfaces of the rollers to accommodate misalignment of the axis X and Y, and wherein the cylindrical raceway extends beyond the ends of the cylindrical intervening surfaces of the rollers, so that the cylindrical raceway can move axially within the row of rollers.

5. A bearing according to claim 3 wherein the centers of longitudinal curvature for each arcuate end surface of each roller is offset slightly from the center of curvature for the spherical raceway.

6. A bearing according to claim 10 wherein the following mathematical relationship exists to generally equalize stresses in the raceways:

$R_1/R_2 \leq \Delta l/l_1 \leq R_1 r_0/R_2 r_1$.

7. An antifriction bearing comprising:

an inner race having an axis X and a cylindrical raceway presented outwardly away from the axis X;

an outer race surrounding the inner race and having an axis Y and a spherical raceway presented inwardly toward the axis Y, with its center of curvature being along the axis Y; and, rollers arranged in a row between the inner and outer races, each roller having two arcuate end surfaces and a substantially cylindrical intervening surface located between the end surfaces, the arcuate end surfaces being contoured longitudinally to generally conform to the spherical raceway, each roller contacting the spherical raceway along its arcuate end surfaces, each roller contacting the cylindrical raceway along its cylindrical surface, the cylindrical surface being slightly crowned so that deflection of the roller and surface elastic deformation in the presence of a load transmitted through the roller do not overly concentrate stresses at the ends of the cylindrical intervening surface, the centers of longitudinal curvature for each arcuate end surface of each roller being offset slightly from the center of curvature for the spherical raceway wherein the amount of offset is governed by the following mathematical formulae:

$$x_{01} = [m\sin(\kappa - \frac{\gamma}{2}) + n\cos\kappa]R_2$$

$$y_{01} = [m\cos(\kappa - \frac{\gamma}{2}) - n\sin\kappa]R_2$$

8. An antifriction bearing comprising:

an inner race having an axis X and a cylindrical raceway presented outwardly away from the axis X;

an outer race surrounding the inner race and having an axis Y and a spherical raceway presented inwardly toward the axis Y, with its center of curvature being along the axis Y; and, rollers arranged in a row between the inner and outer races, each roller having two arcuate end surfaces and a substantially cylindrical intervening surface located between the end surfaces, the arcuate end surfaces being contoured longitudinally to generally conform to the spherical raceway, each roller contacting the spherical raceway along its arcuate end surfaces, each roller contacting the cylindrical raceway along its cylindrical surface, the cylindrical surface being slightly crowned so that deflection of the roller and surface elastic deformation in the presence of a load transmitted through the roller do not overly concentrate stresses at the ends of the cylindrical intervening surface, wherein the amount of crowning of the cylindrical intervening surfaces on the rollers is governed by the following mathematical formula:

$$\delta(x) = \delta_e(x) + \delta_b(x) =$$

$$\frac{2p_0}{\pi E'} \int_0^{l_c} \int_{-b}^{b} \frac{\sqrt{1-(\frac{y'}{b})}}{\sqrt{(x-x')^2 + y'^2}} dx' dy' + \frac{b}{12}\left(\frac{p_0}{E_{rol}}\right)\frac{x(x^3 - 2x^2 l_c + l_c^3)}{r_0^4}$$

9. An antifriction bearing comprising:

an inner race having an axis X and a cylindrical raceway presented outwardly away from the axis X;

an outer race surrounding the inner race and having an axis Y and a spherical raceway presented inwardly toward the axis Y, with its center of curvature being along the axis Y; and, rollers arranged in a row between the inner and outer races, each roller having two arcuate end surfaces and a substantially cylindrical intervening surface located between the end surfaces, the arcuate end surfaces being contoured longitudinally to generally conform to the spherical raceway, each roller contacting the spherical raceway along its arcuate end surfaces, each roller contacting the cylindrical raceway along its cylindrical surface, the cylindrical surface being slightly crowned so that deflection of the roller and surface elastic deformation in the presence of a load transmitted through the roller do not overly concentrate stresses at the ends of the cylindrical intervening surface, wherein the following mathematical relationship exists to avoid contact between the spherical raceway and the arcuate end surfaces at the arcuate end surfaces: t,0240

$R=(1-m)R_2$ $m>m_0$.

* * * * *